(12) United States Patent
Devenyi

(10) Patent No.: US 6,621,948 B1
(45) Date of Patent: Sep. 16, 2003

(54) APPARATUS AND METHOD FOR DIFFERENTIAL OUTPUT OPTICAL FIBER DISPLACEMENT SENSING

(75) Inventor: Gabor Devenyi, Pentang (CA)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 10/162,949

(22) Filed: Jun. 4, 2002

(51) Int. Cl.[7] .................................................. G02B 6/32
(52) U.S. Cl. ........................ 385/13; 250/227.16; 356/32
(58) Field of Search ............................... 385/12, 13, 32, 385/42; 250/227.14, 227.16; 356/477, 482, 32

(56) References Cited

U.S. PATENT DOCUMENTS

| | | | |
|---|---|---|---|
| 4,472,628 A | 9/1984 | Whitten | |
| 4,560,016 A | 12/1985 | Ibanez et al. | |
| 4,671,659 A | 6/1987 | Rempt et al. | |
| 5,056,884 A | 10/1991 | Quinlan, Jr. | |
| 5,321,257 A | * 6/1994 | Danisch | 250/227.16 |
| 5,694,497 A | * 12/1997 | Sansone | 385/13 |
| 6,353,394 B1 | 3/2002 | Maeda et al. | |
| 6,429,421 B1 | * 8/2002 | Meller et al. | 250/227.14 |
| 6,498,877 B1 | * 12/2002 | Chowdhury et al. | 385/37 |

* cited by examiner

*Primary Examiner*—David V. Bruce
*Assistant Examiner*—Thomas R Artman
(74) *Attorney, Agent, or Firm*—William C. Schubert; Glenn H. Lenzen, Jr.

(57) ABSTRACT

A differential output optical fiber displacement sensor includes a structure subject to mechanical displacement over a displacement range. A pair of optical fibers is positioned so that the first optical fiber and the second optical fiber bend inversely to each other over at least part of the displacement range when the structure experiences mechanical displacement. The light transmitted through each of the optical fibers is measured, and a differential calculator determines the difference between the two transmitted light signals.

20 Claims, 3 Drawing Sheets

APPARATUS AND METHOD FOR DIFFERENTIAL OUTPUT OPTICAL FIBER DISPLACEMENT SENSING

This invention relates to the sensing of mechanical displacement and, more particularly, to such sensing using optical fibers.

BACKGROUND OF THE INVENTION

Displacement sensors provide an indication of the position of an object and its movement. A wide variety of mechanical, electrical, and optical displacement sensors are known. The selection of a particular type of displacement sensor is made responsive to the geometry of the displacement, the magnitude of the displacement, whether the displacement readout is to be local or remote, and other factors.

An optical fiber that is straight or has relatively gentle bends transmits light energy with total internal reflection, so that substantially no light energy is lost as the light is propagated through the optical fiber. However, if the optical fiber is bent to a sharper curvature past a critical minimal value, the total internal reflection is disrupted, and light energy is lost responsive to the sharpness of the bend in the optical fiber. In one type of optical displacement sensor, an optical fiber is positioned so that it is bent by the displacement of an object. The greater the displacement of the object past the critical minimal value, the greater is the bending of the optical fiber and the greater is the attenuation of the light propagated through the optical fiber. The extent of the displacement of the object is determined from a calibration of the bending and the attenuation of light.

Optical fiber displacement sensors have many advantages, including light weight, remote readout, and the ability to provide the readout in either a light-based or an electrical-based readout. Existing optical fiber displacement sensors work well for a variety of applications, but are limited in their application and even ineffective in others. There is a need for an improved approach to optical fiber displacement sensors that extends the use of such sensors to applications for which they are not now suitable. The present invention fulfills this need, and further provides related advantages.

SUMMARY OF THE INVENTION

The present invention provides an optical fiber displacement sensor and a method for performing optical fiber displacement sensing. The displacement sensing approach is highly accurate. It also provides temperature compensation, so that the sensed position is not affected by the temperature of the object being sensed. The present approach is suitable for applications wherein small displacements from zero displacement are to be measured, and for applications where displacements over a range extending through an undisplaced state are to be measured. In a conventional optical fiber displacement sensor, the attenuation begins only when a critical radius for loss of total internal reflection (TIR) is reached. There is no attenuation and no output reading for small displacements. In the present approach, on the other hand, there is an output signal even with very small displacements. Additionally, the present approach senses displacement continuously from a positive displacement of the object, through zero displacement of the object (i.e., an undeformed object), and to a negative displacement of the object.

In accordance with the invention, a differential output optical fiber displacement sensor comprises a structure subject to mechanical displacement over a displacement range, and a pair of optical fibers. The pair of optical fibers includes a first optical fiber having a first-fiber input end, a first-fiber central section contacting the structure, and a first-fiber output end, and a second optical fiber having a second-fiber input end, a second-fiber central section contacting the structure, and a second-fiber output end. (There may be more than one first optical fiber and more than one second optical fiber.) The first-fiber central section and the second-fiber central section bend inversely to each other over at least part of the displacement range when the structure experiences mechanical displacement. A light source introduces a first input light signal into the first-fiber input end, and a second input light signal into the second-fiber input end. A light detector detects a first output light signal from the first-fiber output end, and a second output light signal from the second-fiber output end. A differential calculator calculates a difference value responsive to a difference between the first output light signal and the second output light signal and provides an output signal responsive to the difference value. Preferably, at least one of the first optical fiber and the second optical fiber is not totally internally reflective over all displacements in the displacement range.

The structure may comprise a mechanical movement. In one case, the mechanical movement includes a first fixed support contacted by the first optical fiber, a second fixed support contacted by the second optical fiber, and a movable element intermediate between the first fixed support and the second fixed support. The movable element contacts each of the first optical fiber and the second optical fiber over at least part of the displacement range. The movable element may be pivotably movable or linearly movable.

In such a mechanical movement, the first fixed support may comprise at least one, and preferably more than one, first fixed-support fulcrums contacted by the first optical fiber so that the first optical fiber may bend over the first fixed-support fulcrum. The second fixed support may comprise at least one, and preferably more than one, second fixed-support fulcrum contacted by the second optical fiber so that the second optical fiber may bend over the second fixed-support fulcrum. The movable element intermediate between the first fixed support and the second fixed support may comprise at least one, and preferably more than one, movable-element fulcrum disposed between the first fixed support and the second fixed support. The movable element contacts each of the first optical fiber and the second optical fiber over at least part of the displacement range to bend the respective optical fibers over their respective fixed-support fulcrums. In one design, each of the fulcrums is a support pin extending parallel to the other support pins.

The light source may include a single light-producing element producing both the first input light signal and the second input light signal. The light source may include instead a first light-producing element producing the first input light signal, and a second light-producing element producing the second input light signal. The first input light signal and the second input light signal may be of substantially the same value, or of different values.

The light detector may include a single light sensor producing both the first output light signal and the second output light signal. The light detector may instead include a first light sensor producing the first output light signal, and a separate second light sensor producing the second output light signal.

A method for performing differential output optical fiber displacement sensing comprises the steps of providing a first optical fiber and a second optical fiber, bending the first optical fiber and the second optical fiber such that a single mechanical movement causes a first bending deformation in the first optical fiber to increase and a second bending deformation in the second optical fiber to decrease, and measuring a difference value responsive to a difference between a first light intensity transmitted through the first optical fiber and a second light intensity transmitted through the second optical fiber. A temperature of operation may be changed concurrently with the steps of bending and measuring.

The present approach provides an output signal responsive to the displacement of the object, which may be a mechanical movement. Both optical fibers are sensing fibers. The output signal is therefore highly sensitive to the displacement, and yet is insensitive to temperature changes because the temperatures of both optical fibers are the same. There is an output signal for even very small displacements. The present approach senses displacement continuously from a positive displacement of the object, through zero displacement of the object (i.e., an undeformed object), and to a negative displacement of the object, without any range of displacement where there is no displacement signal. The optical fibers may be bent asymmetrically, so that the output signal is tailored to be greater in a selected direction or extent of deformation.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
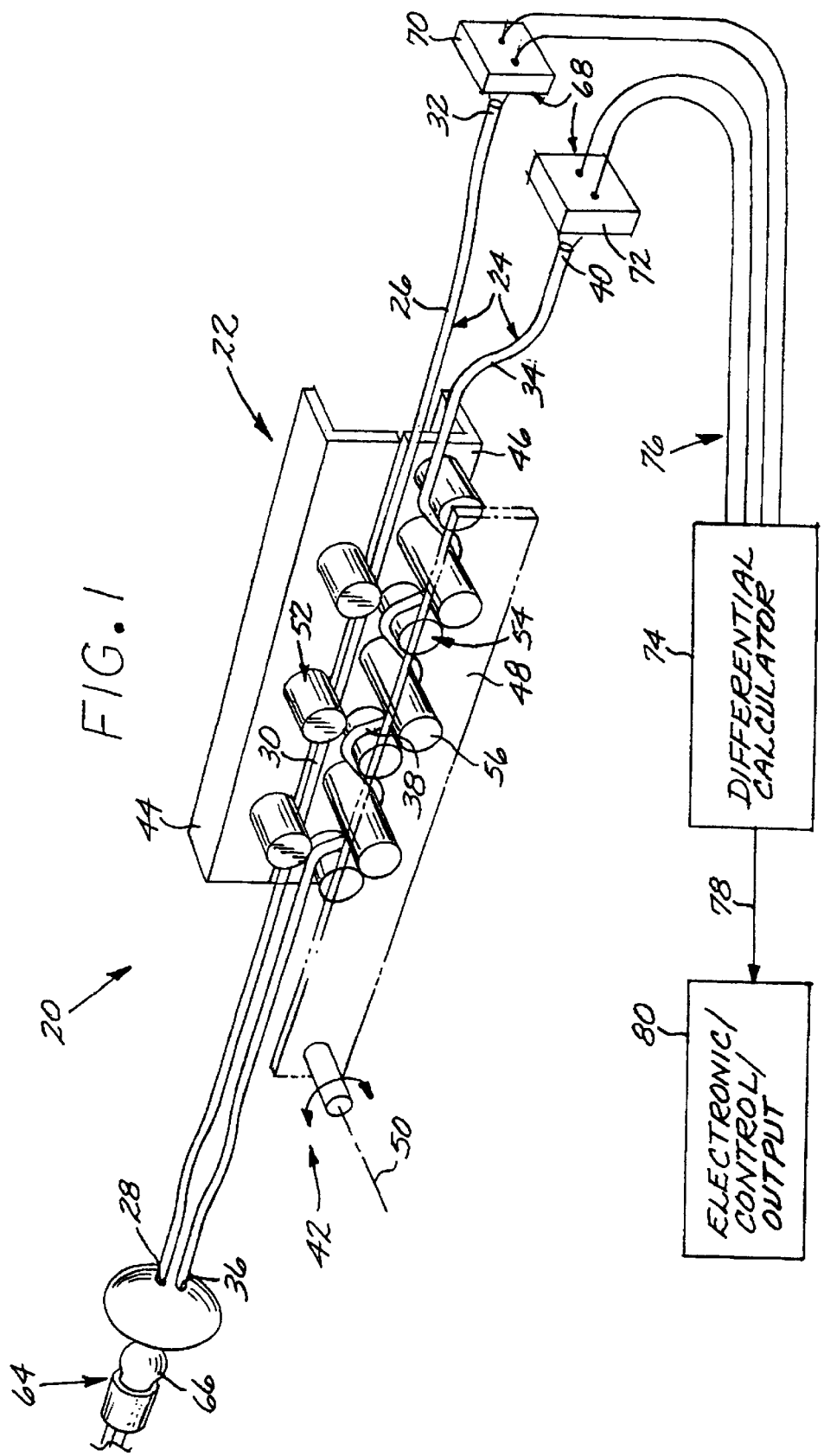
FIG. 1 is a perspective view of an apparatus including a differential output optical fiber displacement sensor operating with a mechanical movement.

FIGS. 1–4 depict a preferred first embodiment of a differential output optical fiber displacement sensor 20. The sensor 20 includes a structure 22 subject to mechanical displacement over a displacement range. The "displacement range" is a total extent of the mechanical displacement. The sensor 20 further comprises a pair of optical fibers 24 including a first optical fiber 26 having a first-fiber input end 28, a first-fiber central section 30 contacting the structure 22, and a first-fiber output end 32; and a second optical fiber 34 having a second-fiber input end 36, a second-fiber central section 38 contacting the structure 22, and a second-fiber output end 40. The term "contact" includes both a direct mechanical contact and an indirect contact through an intermediate element such as the fulcrums and pins to be described below. The first optical fiber 26 may comprise multiple first optical fibers 26, all arranged so as to be bent in the same sense, and the second optical fiber 34 may comprise multiple second optical fibers 34, all arranged so as to be bent in the same sense.

In the illustrated embodiment, the structure 22 has a mechanical movement 42 including a first fixed support 44 contacted by the first optical fiber 26, a second fixed support 46 contacted by the second optical fiber 34, and a movable element 48 at least a portion thereof positioned intermediate between the first fixed support 44 and the second fixed support 46. (In the illustrated embodiment, the fulcrums of the movable element 48 are positioned between the fulcrums of the fixed supports 44 and 46.) In this case, the movable element 48 is pivotably movable about a pivot point 50. The movable element 48 contacts each of the first optical fiber 26 and the second optical fiber 34 over at least part of the displacement range.

The first fixed support 44 desirably has at least one, and preferably more than one, first fixed-support fulcrum 52 contacted by the first optical fiber 26 so that the first optical fiber 26 may bend over the first fixed-support fulcrum 52. The second fixed support 46 has at least one, and preferably more than one, second fixed-support fulcrum 54 contacted by the second optical fiber 34 so that the second optical fiber 34 may bend over the fixed-support fulcrum 54. The movable element 48 positioned intermediate between the first fixed support 44 and the second fixed support 46 comprises at least one, and preferably more than one, movable-element fulcrum 56 disposed between the first fixed support 44 and the second fixed support 46. The movable element 48 thus contacts each of the first optical fiber 26 and the second optical fiber 34 over at least part of the displacement range to bend the respective optical fibers 26, 34 over their respective fixed-support fulcrums 52, 54. In the illustrated embodiment, the first fixed-support fulcrum 52 is formed by first fixed-support pins 58, the second fixed-support fulcrum 54 is formed by second fixed-support pins 60, and the movable-element fulcrum 56 is formed by movable-element pins 62. The support pins 58, 60, and 62 are desirably rounded on their surfaces that are contacted by the optical fibers 26 and 34, and may be made conveniently as cylindrical pins extending parallel to each other.

The first-fiber central section 30 and the second-fiber central section 38 bend inversely to each other over at least part of the displacement range when the structure experiences mechanical displacement. That is, a single mechanical movement causes the first-fiber central section 30 to become more severely bent and the second-fiber central section 38 to become less severely bent, or alternatively the single mechanical movement causes the first-fiber central section 30 to become less severely bent and the second-fiber central section 38 to become more severely bent.

A feature of an optical fiber is that light is propagated therethrough by total internal reflection so that there is substantially no loss of light intensity, when the optical fiber is unbent or only slightly bent. However, when the optical fiber is bent to a radius of curvature less than a critical value, the total internal reflection is disrupted in the highly curved portion so that the transmission of light through the optical fiber is attenuated as a function of the curvature and the extent of the curved length. In the present displacement sensor 20, it is preferred that at least one of the first optical fiber 26 and the second optical fiber 34 is not totally internally reflective at all displacements in the displacement range. That is, the first optical fiber 26 is not totally internally reflective over a first-fiber displacement range, and the second optical fiber 34 is not totally internally reflective over a second-fiber displacement range. The first-fiber displacement range and the second fiber displacement range overlap and together encompass the entire displacement range of the structure. In this way, at least one of the first optical fiber 26 and the second optical fiber 34 is always bent beyond its critical value.

A light source 64 introduces a first input light signal into the first-fiber input end 28, and a second input light signal into the second-fiber input end 36. In the embodiment of FIGS. 1–4, there is a single light-producing element 66, such as a light emitting diode or a laser, producing both the first input light signal and the second input light signal.

A light detector 68 detects a first output light signal from the first fiber output end 32, and a second output light signal from the second-fiber output end 40. In the embodiment of FIGS. 1–4, the light detector 68 includes a first light sensor 70 producing the first output light signal, and a second light sensor 72 producing the second output light signal. The light detector 68 is illustrated as a conventional light-to-electrical sensor. The light detector 68 may be of any other operable type, such as an all-light device that achieves signal processing using only light.

A differential calculator 74 receives an output 76 of the light detector 68, usually as electrical signals, and calculates a difference value responsive to a difference between the first output light signal and the second output light signal. The differential calculator 74 provides an output signal 78 responsive to the difference value, such as to an electronics/control/output device 80. The differential calculator 74 may be combined and integrated with the light detector 68, in an all-light device.

This approach has important advantages over conventional optical fiber displacement sensors. First, both optical fibers 26 and 34 are used in the sensing function, yet any temperature change is nulled because both optical fibers 26 and 34 are at substantially the same temperature and are subjected to identical temperature changes. Any changes in light output due to temperature changes are negated by taking the difference between the light output values. Second, the sensor 20 is operable even through zero displacements of the mechanical movement 42. If only a single optical fiber were used, there would be no sensor output when the optical fiber is not bent to a radius of curvature less than the critical value, that is, when the optical fiber is straight or nearly straight. Third, as will be discussed more fully below, the sensor may be made to be asymmetric if desired.

Figure 2:
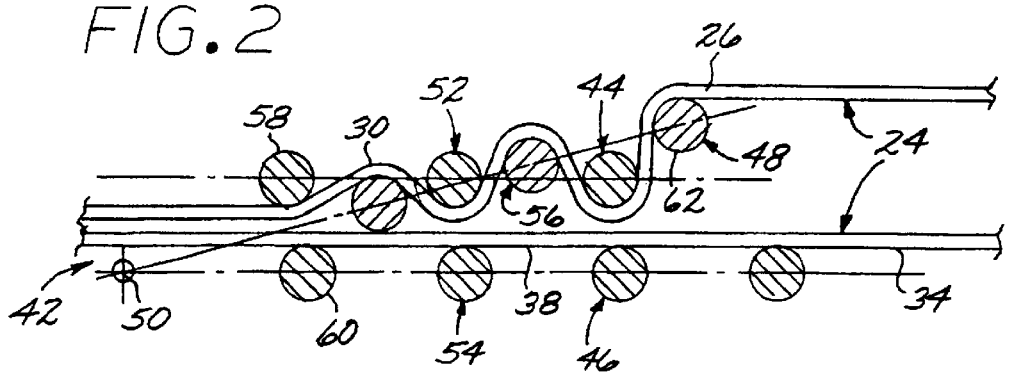
FIGS. 2–4 are schematic fragmented side elevational views of the apparatus of FIG. 1, for different displacements of the mechanical movement.
Figure 3:
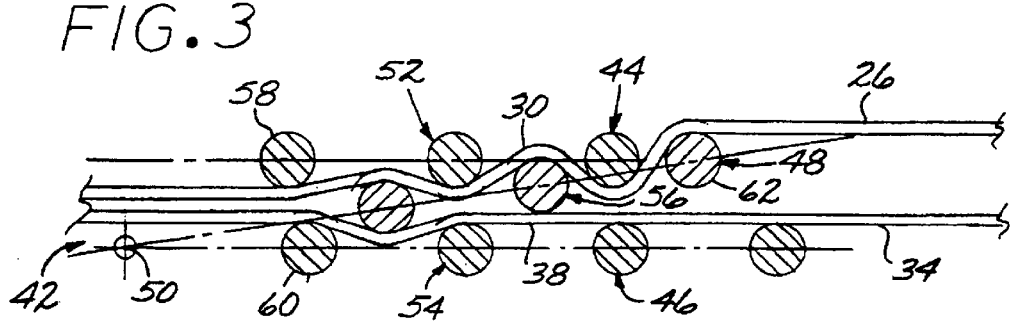
Figure 4:
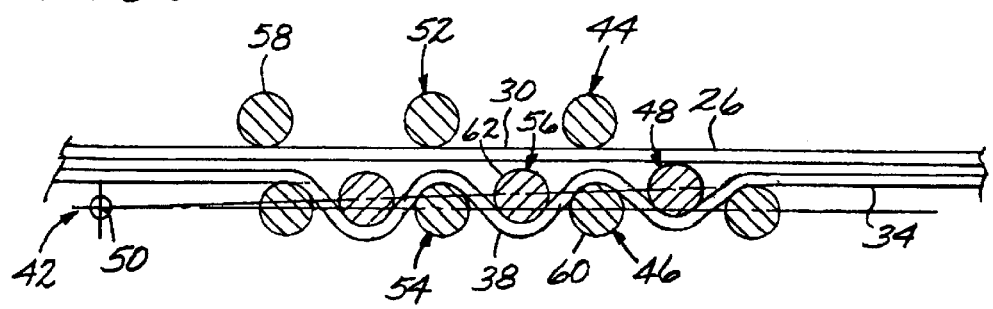

FIGS. 2–4 illustrate the functioning of the sensor 20 over the displacement range of the mechanical movement 42. In FIG. 2, the movable element 48 is in its uppermost position. The first optical fiber 26 is severely bent, and the second optical fiber 34 is unbent. In FIG. 3, the movable element 48 has pivoted clockwise about the pivot point 50 and moved downwardly. The first optical fiber 26 is less severely bent, and the second optical fiber 34 is just beginning to be bent as the movable-element fulcrums 56 begin to force the second optical fiber 34 to bend over one or more of the second fixed support fulcrums 54. As the movable element 48 pivots further clockwise, the first optical fiber 26 becomes progressively less bent, and the second optical fiber 34 becomes progressively more bent, constituting an inverse bending relative to each other. In FIG. 4, the movable element 48 has pivoted clockwise even further about the pivot point 50, so that the first optical fiber 26 is no longer bent at all, and the second optical fiber 34 is severely bent. At all points in the movement of the movable element 42 in this embodiment, one or both of the optical fibers 26 and 34 is bent to less than its critical radius so that it is not totally internally reflecting. This need not be the case, however.

Figure 5:
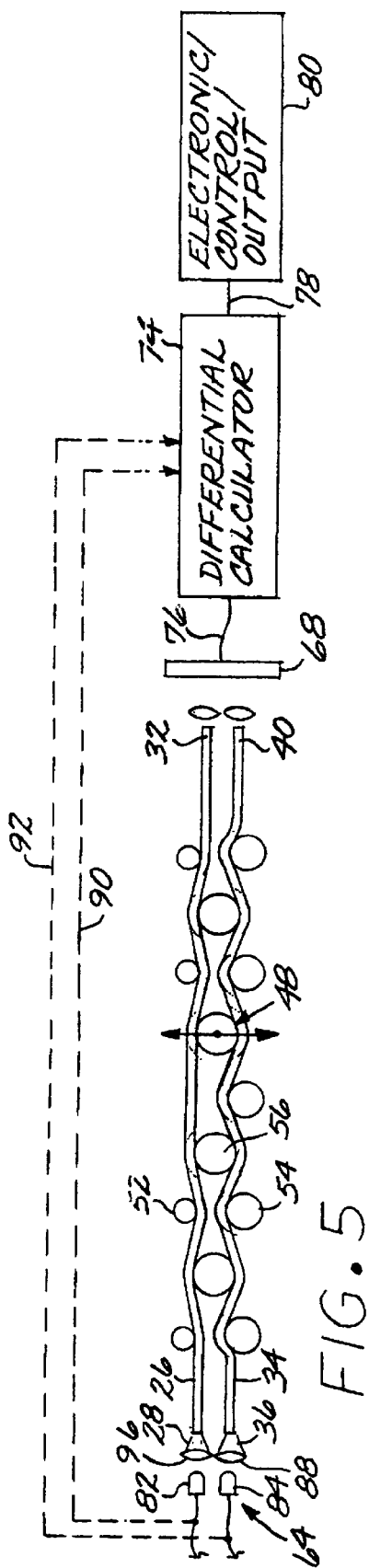
FIG. 5 is a schematic depiction of another embodiment of the apparatus.

FIG. 5 depicts a second embodiment of the sensor 20. Elements common to the embodiment of FIGS. 1–4 are commonly identified in FIG. 5, and the prior description is incorporated. FIG. 5 is presented to illustrate some alternative features and approaches. Features of these two embodiments and other embodiments may be used together and intermixed, where they are not inconsistent.

In the embodiment of FIG. 5, the movable element 48 is linearly movable up and down, as indicated by the up/down arrows, rather than being pivotable as in the embodiment of FIGS. 1–4. The light source 64 includes a first light-producing element 82 introducing the first input light signal to the first-fiber input end 28 through a first focusing lens 86, and a second light-producing element 84 introducing the second input light signal to the second-fiber input end 36 through a second focusing lens 88. In the embodiments of FIGS. 1–4, the light input is from the single light-producing element 66, so that the light intensities in the two optical fibers 26 and 34 are substantially the same value or at least with the same constant ratio to each other. It would be difficult to control the relative light intensities in the two optical fibers 26 and 34 with the embodiment of FIGS. 1–4. In the embodiment of FIG. 5, on the other hand, the light intensities in the two optical fibers 26 and 34 may be arbitrarily controlled. Consequently, it is desirable to provide a first-fiber input intensity signal 90 from the first light-producing element 82 to the differential calculator 74, and a second-fiber input intensity 92 from the second light-producing element 84 to the differential calculator 74. The differential calculator 74 calculates the differences between the respective output and input signals individually for the two optical fibers, and uses this value to calculate the differential between the two optical fibers. Variations in input intensity are thereby normalized. In the embodiment of FIG. 5, there is a single light detector 68 which produces different outputs for the two optical fibers 26 and 34. The single light detector 68 may be, for example, a focal plane array in which a portion of the sensing surface is assigned to the sensing of the output of the optical fiber 26, and another portion of the sensing surface is assigned to the sensing of the output of the optical fiber 34. A focal plane array is a relatively expensive device that would not ordinarily be used in this application, except where it is needed for other functionality in the system such as imaging.

FIG. 5 also illustrates the ability to cause the optical fibers 26 and 34 to function asymmetrically. One type of asymmetry is using different values of the input light signal due to the use of the two respective independently controllable light-producing elements 82 and 84. Another type of asymmetry is found in the mechanical structure that permits the two optical fibers 26 and 34 to be bent asymmetrically. As seen in FIG. 5, the fulcrums 52, 54, and 56 may be made of different sizes and/or radii of curvature. The fulcrums 52 and 54 may be different in number or spaced differently, and in this case there are fewer fulcrums 52 than fulcrums 54, so that there is an asymmetry in the light attenuation between the two optical fibers 26 and 34 at otherwise-equivalent positions of the movable element 48 on either side of its zero-displacement value. The radius of curvature on the opposing sides of the fulcrum 56 may also be made different. The controllability of these features permits the output signals of the two optical fibers 26 and 34 to be controllably different and of different rates of change for different positions of the mechanical movement. This controllability may be used, for example, to produce increased sensitivity in narrow portions of the displacement range, and reduced sensitivity in other portions of the displacement range.

Figure 6:
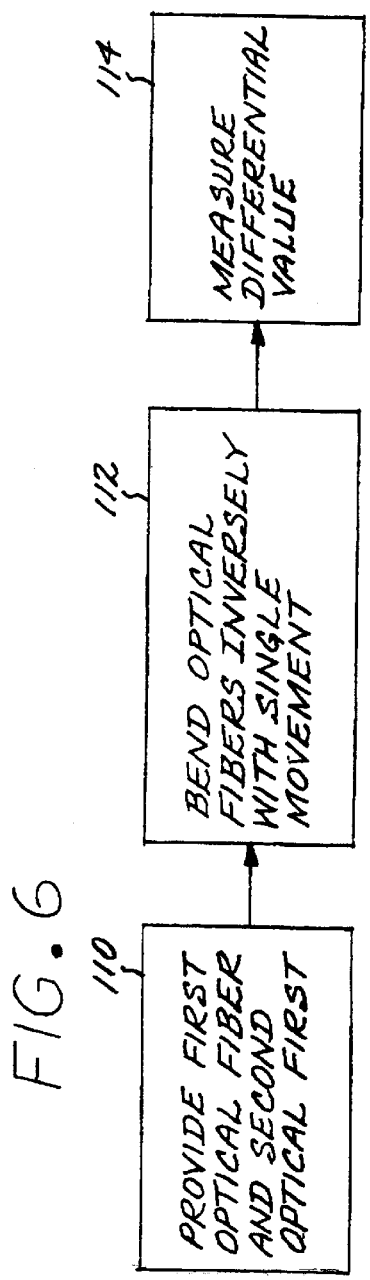
FIG. 6 is a block diagram of a method for performing differential output optical fiber displacement sensing.

FIG. 6 depicts a preferred approach for performing differential output optical fiber displacement sensing. A first optical fiber and a second optical fiber are provided, numeral 110, preferably but not necessarily in the form and arrangement discussed previously. The first optical fiber and the second optical fiber are bent such that a single mechanical movement causes a first bending deformation in the first optical fiber to increase and a second bending deformation in the second optical fiber to decrease (i.e., the inverse bending movement discussed above), numeral 112. A differential value is measured responsive to a difference between a first light intensity transmitted through the first optical fiber and a second light intensity transmitted through the second optical fiber, numeral 114. The prior discussion of apparatus, features, and functionality is incorporated here. As noted, the temperature of operation of the first optical fiber and the second optical fiber may be changed without adverse effects, because the difference, not the sum, of the output light values is calculated.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A differential output optical fiber displacement sensor, comprising:
   a structure subject to mechanical displacement over a displacement range;
   a pair of optical fibers including
      a first optical fiber having a first-fiber input end, a first-fiber central section contacting the structure, and a first-fiber output end, and
      a second optical fiber having a second-fiber input end, a second fiber central section contacting the structure, and a second-fiber output end, wherein the first-fiber central section and the second-fiber central section bend inversely to each other over at least part of the displacement range when the structure experiences mechanical displacement;
   a light source which introduces a first input light signal into the first-fiber input end, and a second input light signal into the second-fiber input end;
   a light detector which detects a first output light signal from the first-fiber output end, and a second output light signal from the second-fiber output end; and
   a differential calculator which calculates a difference value responsive to a difference between the first output light signal and the second output light signal and provides an output signal responsive to the difference value.

2. The displacement sensor of claim 1, wherein the structure comprises a mechanical movement.

3. The displacement sensor of claim 1, wherein the structure comprises a mechanical movement including
   a first fixed support contacted by the first optical fiber,
   a second fixed support contacted by the second optical fiber, and
   a movable element intermediate between the first fixed support and the second fixed support, the movable element contacting each of the first optical fiber and the second optical fiber over at least part of the displacement range.

4. The displacement sensor of claim 3, wherein the movable element is pivotably movable.

5. The displacement sensor of claim 3, wherein the movable element is linearly movable.

6. The displacement sensor of claim 1, wherein the structure comprises a mechanical movement including
   a first fixed support comprising at least one first fixed-support fulcrum contacted by the first optical fiber so that the first optical fiber may bend over the first fixed-support fulcrum,
   a second fixed support comprising at least one second fixed-support fulcrum contacted by the second optical fiber so that the second optical fiber may bend over the second fixed-support fulcrum, and
   a movable element intermediate between the first fixed support and the second fixed support and comprising at least one movable-element fulcrum disposed between the first fixed support and the second fixed support, the movable element contacting each of the first optical fiber and the second optical fiber over at least part of the displacement range to bend the respective optical fibers over their respective fixed-support fulcrums.

7. The displacement sensor of claim 1, wherein the light source includes a single light-producing element producing both the first input light signal and the second input light signal.

8. The displacement sensor of claim 1, wherein the light source includes
   a first light-producing element producing the first input light signal, and
   a second light-producing element producing the second input light signal.

9. The displacement sensor of claim 1, wherein the first input light signal and the second input light signal are of substantially the same value.

10. The displacement sensor of claim 1, wherein the light detector includes a single light sensor producing both the first output light signal and the second output light signal.

11. The displacement sensor of claim 1, wherein the light detector includes
    a first light sensor producing the first output light signal, and
    a second light sensor producing the second output light signal.

12. The displacement sensor of claim 1, wherein at least one of the first optical fiber and the second optical fiber is not totally internally reflective at all displacements in the displacement range.

13. The displacement sensor of claim 1, wherein the first optical fiber and the second optical fiber are bent asymmetrically over the displacement range.

14. A differential output optical fiber displacement sensor, comprising:
    a pair of optical fibers including
       a first optical fiber having a first-fiber input end, a first-fiber central section contacting the structure, and a first-fiber output end, and
       a second optical fiber having a second-fiber input end, a second-fiber central section contacting the structure, and a second-fiber output end,
    a mechanical movement including
       a first fixed support comprising at least two first fixed-support pins contacted by the first optical fiber so that the first optical fiber may bend over the at least two first fixed-support pins,
       a second fixed support comprising at least two second fixed-support pins contacted by the second optical fiber so that the second optical fiber may bend over the at least two second fixed-support pins, and a movable element intermediate between the first fixed support and the second fixed support and comprising at least two movable-element pins disposed between the first fixed support and the second fixed support, the movable element contacting each of the first optical fiber and the second optical fiber over at least part of the displacement range to bend the respective optical fibers over their respective fixed-support pins;

a light source which introduces a first input light signal into the first-fiber input end, and a second input light signal into the second-fiber input end;

a light detector which detects a first output light signal from the first-fiber output end, and a second output light signal from the second-fiber output end; and a differential calculator which calculates a difference value responsive to a difference between the first output light signal and the second output light signal and provides an output signal responsive to the difference value.

15. The displacement sensor of claim 14, wherein the movable element is pivotably movable.

16. The displacement sensor of claim 14, wherein the movable element is linearly movable.

17. The displacement sensor of claim 14, wherein at least one of the first optical fiber and the second optical fiber is not totally internally reflective at all displacements in the displacement range.

18. The displacement sensor of claim 14, wherein the first optical fiber and the second optical fiber are bent asymmetrically over the displacement range.

19. A method for performing differential output optical fiber displacement sensing, comprising the steps of providing a first optical fiber and a second optical fiber;

bending the first optical fiber and the second optical fiber such that a single movement causes a first bending deformation in the first optical fiber to increase and a second bending deformation in the second optical fiber to decrease; and measuring a difference value responsive to a difference between a first light intensity transmitted through the first optical fiber and a second light intensity transmitted through the second optical fiber.

20. The method of claim 19, including a further step, conducted concurrently with the steps of bending and measuring, of changing a temperature of operation of the first optical fiber and the second optical fiber.

* * * * *